US011912555B1

(12) United States Patent
Raymus

(10) Patent No.: US 11,912,555 B1
(45) Date of Patent: Feb. 27, 2024

(54) MIXING CONTAINER CONFIGURED FOR FUNNELED ENGAGEMENT WITH DRINK CONTAINERS

(71) Applicant: Tommy Raymus, Manteca, CA (US)

(72) Inventor: Tommy Raymus, Manteca, CA (US)

( * ) Notice: Subject to any disclaimer, the term of this patent is extended or adjusted under 35 U.S.C. 154(b) by 0 days.

(21) Appl. No.: 17/939,715

(22) Filed: Sep. 7, 2022

(51) Int. Cl.
*B67C 11/02* (2006.01)
*B65D 1/06* (2006.01)
*B65D 21/02* (2006.01)
*B67C 11/00* (2006.01)

(52) U.S. Cl.
CPC ................ *B67C 11/02* (2013.01); *B65D 1/06* (2013.01); *B65D 21/0233* (2013.01); *B67C 2011/20* (2013.01)

(58) Field of Classification Search
CPC ....... B67C 11/02; B67C 2011/20; B65D 1/06; B65D 21/0233
USPC .................................................. 141/331–345
See application file for complete search history.

(56) References Cited

U.S. PATENT DOCUMENTS 1,740,418 A * 12/1929 Donnelly ................ B67C 11/02 141/340
4,531,245 A * 7/1985 Lowd ..................... A61G 9/006 604/347
4,706,719 A * 11/1987 Eversdijk ................ B67C 11/02 141/98
4,832,238 A * 5/1989 Taylor .................... B65D 25/48 D7/700
5,402,835 A * 4/1995 Middleton .............. B67C 11/00 141/331
5,676,185 A * 10/1997 Starr ....................... B67C 11/02 141/300
6,098,678 A * 8/2000 Shears .................... B67C 11/02 141/331
6,223,792 B1 * 5/2001 Slagle .................. B65D 47/243 141/345
7,635,013 B2 * 12/2009 Ballinger ................ B67C 11/00 141/331
2003/0127469 A1 * 7/2003 Terry ....................... B65D 1/06 222/158
2009/0188581 A1 * 7/2009 Assemacher ......... F16N 31/002 141/340
2016/0130042 A1 * 5/2016 Gascoine ............... B65D 25/14 220/288
2018/0099849 A1 * 4/2018 Schmitt .................. B67C 11/04
2022/0348381 A1 * 11/2022 Pan ....................... B05B 7/2481

FOREIGN PATENT DOCUMENTS

CN WO-2013/170402 A1 * 11/2013 ............. B65D 11/04
CN 207631665 U * 7/2018
FR 2726544 A1 * 5/1996 ............. B67C 11/02

* cited by examiner

*Primary Examiner* — Timothy L Maust
(74) *Attorney, Agent, or Firm* — Boris Leschinsky

(57) ABSTRACT

A container and system therefor is provided herein, wherein the containers are configured to store and transport user chosen contents therein, such as supplements or powders for mixing with liquids in a secondary container. A removable upper lid of the container is configured to form a stand when frictionally engaged to a lower lid engaged to the body. In use, the containers having a funnel shape that are positionable to a funneled engagement with the secondary container for depositing of the contents thereof into a fluid or other container. The containers are configured for a nesting engagement of a kit having multiple container bodies to nest in a compact stack.

9 Claims, 4 Drawing Sheets

MIXING CONTAINER CONFIGURED FOR FUNNELED ENGAGEMENT WITH DRINK CONTAINERS

BACKGROUND OF THE INVENTION

1. Field of the Invention

The present invention relates generally to portable containers which hold supplements and the like. More particularly, the invention relates to mixing containers configured to function both as a portable reusable container to carry powder supplements which is configured to act as a funnel for depositing the container contents into a drink container or bottle for mixing into the fluid therein.

2. Prior Art

Portable containers for food and supplements are widely sold and employed by users to hold food or supplements or other edible contents. Modernly, such containers are formed of polymeric materials which renders them lightweight yet sufficiently sturdy such that they hold their shape and resist puncture or damage during transport, such as by a user in a backpack.

In the field of body building and sports, the use of supplements has become widely accepted to help accelerate fitness levels and physical improvement. Such supplements are popular with body builders, runners, cross trainers, and athletes in all areas of sport. Whether the exerciser is an amateur or professional, it has become part of a fitness regimen to include dietary supplements which may be taken prior to, during, and after exercise.

Using modernly determined knowledge concerning dietary supplements and their effect on the body, many sports enthusiasts as well as people just following a more healthy lifestyle have adopted a lifestyle which includes the mixing and ingesting of dietary supplement products of all sorts for all reasons. During periods of training and heavy exercise many athletes will ingest a determined number of supplements which may also have synergistic affect on the body and athletic performance. Conversely, during periods of physical recoupment athletes and fitness buffs may alter their supplement intake to those that are known to aid in recovery.

To this end, athletes, fitness buffs, and ordinary persons adopting a more health conscious lifestyle have chosen to ingest differing supplements for differing routines or goals on a regular basis. To maximize the physical gain and affect on the body, such supplements are preferably precisely measured and then are mixed with a carrier liquid which can be simple water or milk or may be a liquid adapted to work to a synergistic outcome when paired with certain supplements.

In following such a regimen, especially where supplements are ingested during or right after an athletic work out or training session, a need for carrying different supplements in precise quantities has evolved. Those ingesting supplements to maximize the outcome, therefor, must measure them and package them for ingestion at the proper time and in the proper amounts. This is especially true where powders and the like are mixed with liquid and ingested in multiple servings at different times. Such has resulted in supplement users employing plastic bags and cups as well as re-sealable containers for holding, transport and mixing of such supplements with the desired liquid.

The forgoing examples of related containers for contents to be mixed, such as supplements and the like, are intended to be illustrative and not exclusive, and they do not imply any limitations on the invention described and claimed herein. Various limitations of the related art will become apparent to those skilled in the art upon a reading and understanding of the specification below and the accompanying drawings.

With respect to the above, before explaining at least one preferred embodiment of the mixing container system herein, it is to be understood that the disclosed mixing container device and system are not limited in application to the details of employment and to the arrangement of the components or the steps set forth in the following description or illustrated in the drawings. The various apparatus and operations of the herein disclosed mixing containers system are capable of other embodiments, and of being practiced and carried out in various equivalent ways, all of which will be obvious to those skilled in the art once the information herein is reviewed.

Also, it is to be understood that the phraseology and terminology employed herein are for the purpose of description, and should not be regarded as limiting. As such, those skilled in the art will appreciate that the conception upon which this disclosure is based, may readily be utilized as a basis for other portable and reusable measuring and dispensing containers. It is important, therefore, that the embodiments, objects and claims herein, be regarded as including any and all such equivalent construction and methodology insofar as they do not depart from the spirit and scope of the present invention.

SUMMARY OF THE INVENTION

The device herein disclosed and described provides a solution to the shortcomings in prior art of containers used for storage, transport, and dispersing of their contents into a fluid or secondary container. Each of the containers herein is formed to a shape having a large diameter upper portion defined by a sidewall surrounding a first or larger internal cavity employable to hold contents, such as a supplement. At an upper or first end of the container, a removable first lid covers the first opening communicating with the upper internal cavity. The sidewall defining the shape of the container narrows in circumference at a second or lower end thereby forming the container substantially to a funnel shape.

At the lower or second end of the container is positioned a second opening which communicates with the internal cavity and which has a circumference smaller than the first opening. A removable second lid is engageable with the container at the second end to form a sealed removable engagement over the second opening.

The first lid is configured with a mounting projection extending from a central area of the first lid. The mounting projection is formed by a projection sidewall which surrounds a recess extending into the mounting projection at a distal end. The recess has an internal circumference configured to frictionally engage with the exterior of the second lid. When engaged to the second lid while it is connected to the second end of the container body, the first lid thereby defines a stand to hold the container upright.

Frequently, users of supplement containers will fill multiple such containers with different supplements and the like for use at different times. When a user is filling up a conventional funnel with no stand to hold it in a fixed position, in order to load it with a mixture, the user will have to hold the conventional funnel with one hand while they are scooping the powder from a container and attempting to place it in the funnel with the other hand. This makes loading up such a conventional funnel less convenient, more messy and easy to spill.

Because such a conventional funnel will move and change orientations while held in the hand of the user, it also makes it hard to accurately measure how much powder has been added. Further, where such conventional funnels are used as containers or the like, because they must be hand held, they can only load one funnel at a time. It would be most likely that a user has to take off the wide lid, grab the scoop, scoop in the correct amount of protein, and then grab the wide lid again, put the wide lid back on, and then proceed to grab the second funnel and repeat the same process over again for each one.

In the device and system herein disclosed, the first lid of each funnel shaped container is engageable to form a stand for the body of the container which is removably engaged to the funnel shaped body. Thus, when employing multiple funnel shaped containers herein the user may remove all the first lids at once, flip all of the first lids over, and then engage each with one of the second lids connected to the narrow end of the body of the container. They may place as many containers as needed to transport measured supplements in this fixed upright position where each is held level by the engaged stand. Thereafter, the user may place the appropriate substances and amounts thereof in the respective bodies being held upright all at once. Once finished, the user may remove the first lid from its configuration as a stand and re-engage it to cover over the first opening to hold the measured supplement within the internal cavity of the body of the container.

This ability to configure each body with a removable stand to hold it upright, using a respective first lid thereon, makes it a much easier and more organized process, in addition to making the process itself faster and cleaner. Also, since the stands positioned on a level surface render the bodies upright and substantially perpendicular, the user can clearly see a level amount of mixtures placed in the internal cavity to ascertain how much powder supplement has been placed into each respective internal cavity of each respective funnel shaped container body.

It should be noted that in the use of multiple containers for carrying and mixing supplements, sometimes powdered supplements need to be taken in an exact amount or a user is trying to track their intake out of their own interest. Oftentimes, a user will weigh the powder supplement for tracking such measurements rather than measuring by volume. With the device herein having the first lid engaged as a stand for the body of the container, the user doesn't have to put the first lid back on to weigh the contents. The user can add or subtract from the funnel shaped body while it is held by the first lid in the standing or upright position. This eliminates having to use other methods or containers to weigh the powder or having to seal and unseal the lid to a funnel without a stand.

In addition to a frictional engagement, shoulders extending from the interior surface of the projection sidewall and into the recess may be included to enhance contact with the exterior of the second lid. This upright positioning allows the user to deposit a volume of their desired contents, such as supplements, through the first opening and into the internal cavity for storage therein. There after the first lid may be re-engaged with the container to seal the first opening.

The narrow second end configures the container to function as a funnel. Such is accomplished by removal of the second lid from the sealed engagement over the second opening. Once the second end of the container is positioned within an opening to a fluid or other secondary container, for example and in no way limiting, such as a water bottle, the contents of the internal cavity can be deposited through the second opening and into the secondary container.

The containers may be provided in a kit of such containers. The kit of containers is stackable in a nested configuration wherein multiple container bodies are positioned within the internal cavity of adjacent container bodies. Also, a member projecting from the exterior of the sidewall defining the body of the container can be included. The projecting member is configured with at least one passage therethrough which can be employed to position a connecter therein and thereby engage the container body to the person or luggage or the like of the user for transport.

With respect to the above description, before explaining at least one preferred embodiment of the herein disclosed portable mixing container configured for a funneled engagement with a drink or liquid container in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other funneled supplement and mixture containers, methods and systems for carrying out the several purposes of the present disclosed device. It is important, therefore, that the claims be regarded as including any and all such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" where not specifically otherwise respectively defined, is plus or minus five percent.

It is an object of this invention to provide a portable and reusable container system for the measurement, transport and mixing of supplements and the like into liquids.

It is an additional object of this invention to provide such a container system wherein the containers are configured for a funneled engagement with liquid holding containers.

It is another object of this invention to provide such a funneled container system wherein the lid of the container is configured to provide a stand to hold the container elevated on a surface.

Yet another object of this invention is the provision of such a container system wherein the funnel shaped containers are stackable in a nesting configuration.

Additional objects, features, and advantages of the invention will be brought out in the following part of the specification, wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting.

DETAILED DESCRIPTION OF THE PREFERRED EMBODIMENTS OF THE INVENTION

Figure 1:
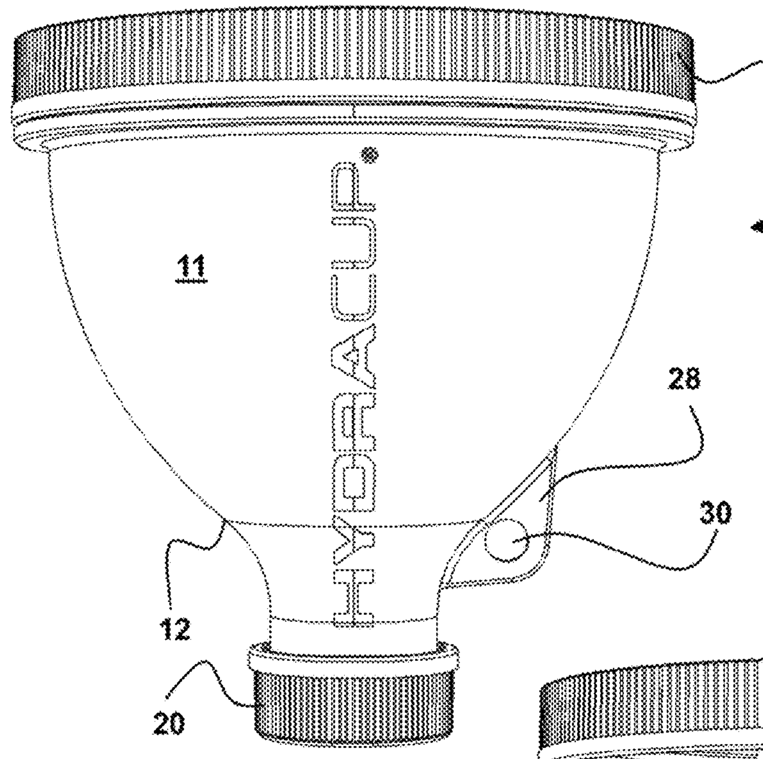
FIG. 1 depicts the container herein showing a side view of the sidewall forming the container body and showing a first lid removably engaged at a first end and a second lid removably engaged at an opposite second end along with a member extending from the exterior having a passage therein.

In this description, the directional prepositions of up, upwardly, down, downwardly, front, back, top, upper, bottom, lower, left, right and other such terms refer to the device as it is oriented and appears in the drawings and are used for convenience only. As such, they are not intended to be limiting in any fashion or to imply that the device has to be used or positioned in any particular orientation.

Now referring to drawings in FIGS. 1-7, wherein similar components are identified by like reference numerals, there is seen in FIG. 1 a depiction of the container device 10 herein. As shown in the side view in FIG. 1, a sidewall 11 defines a substantially funnel shape to the body 12 of the container device 10 herein.

As shown in the figures, a first lid 14 is configured for a removable engagement over a first opening 16 portioned at a first end of the body 12. The first opening 16 communicates with an internal cavity 18 (FIGS. 4-5) of the body 12 of the container device 10 allowing access thereto.

Also shown in FIG. 1 is a second lid 20 which is removably engaged at a second end of the body 12 to cover a second opening 22 which also communicates with the internal cavity 18. This second lid 20 has a disengaged position, shown in FIG. 2, as does the first lid 14 also shown disengaged in FIG. 2. Cooperative connectors 24 located adjacent the first opening 16 are configured to removably engage with mating cooperative connectors 26 formed on the first lid 14. Cooperative connectors 24 adjacent the second opening 22 are configured to removably engage with the mating cooperative connectors 26 formed into the second lid 20. Currently, threads formed on the body 12 of the container device 10 form the cooperative connectors 24, and mating threads form the mating cooperative connectors 26. However, other cooperative connectors and mating cooperative connectors which provide the equivalent removable engagement can be employed and are anticipated in the scope of this application. However, due to the ease of use, intuitive engagement, and the ability for the user to easily tighten the contact of both the first lid 14 and second lid 20 to form sealed engagements over the respective first opening 16 and second opening 22, threaded connectors are preferred.

Figure 2:
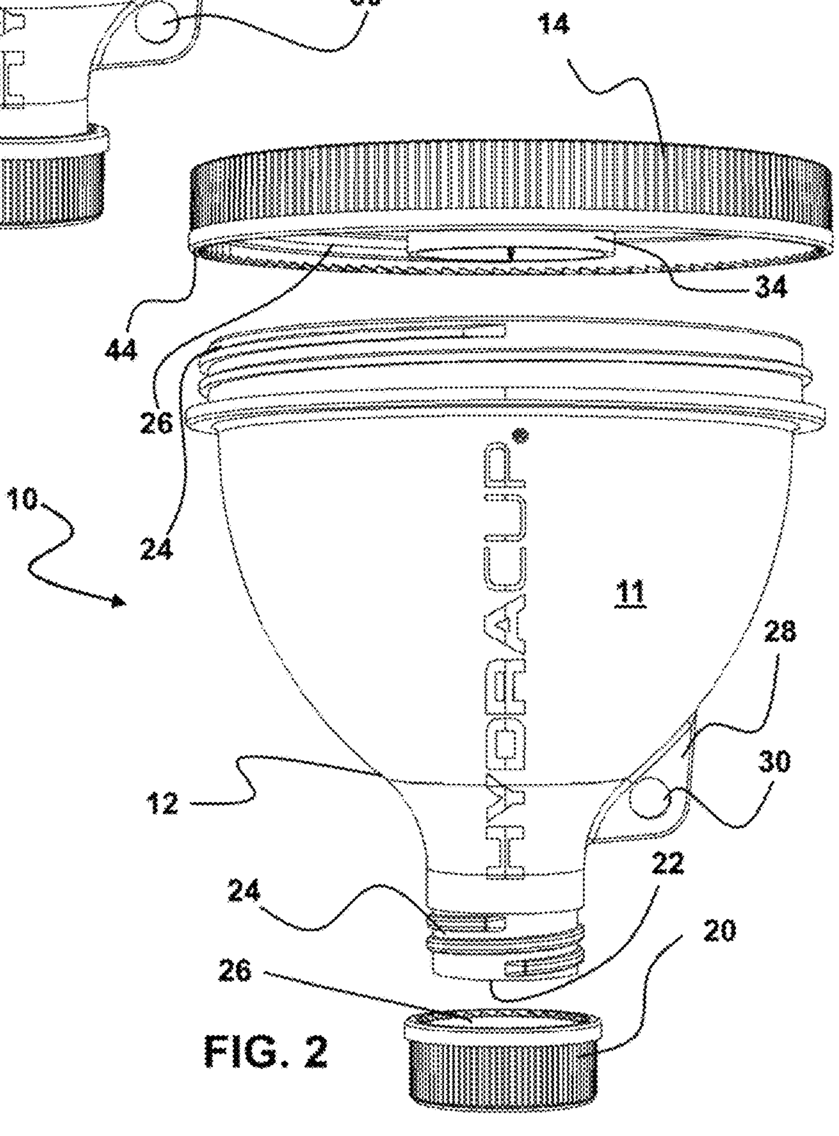
FIG. 2 depicts an exploded view of the container of FIG. 1 showing the cooperative removable engagements of the first lid and second lid to opposite ends of the body of the container.

Additionally shown in FIGS. 1-2 and other figures are a connecting member 28 which extends from a first end engaged to the body 12 to a distal edge. A passage 30 is formed through the connecting member 28. This passage 30 is configured for engagement of a connector therethrough to removably connect the device 10 to clothing or backpacks or the like worn by the user. Such allows for the container device 10 to be packed within luggage or a backpack or the like, or to be hung exterior thereto or on the person of the user.

Figure 3:
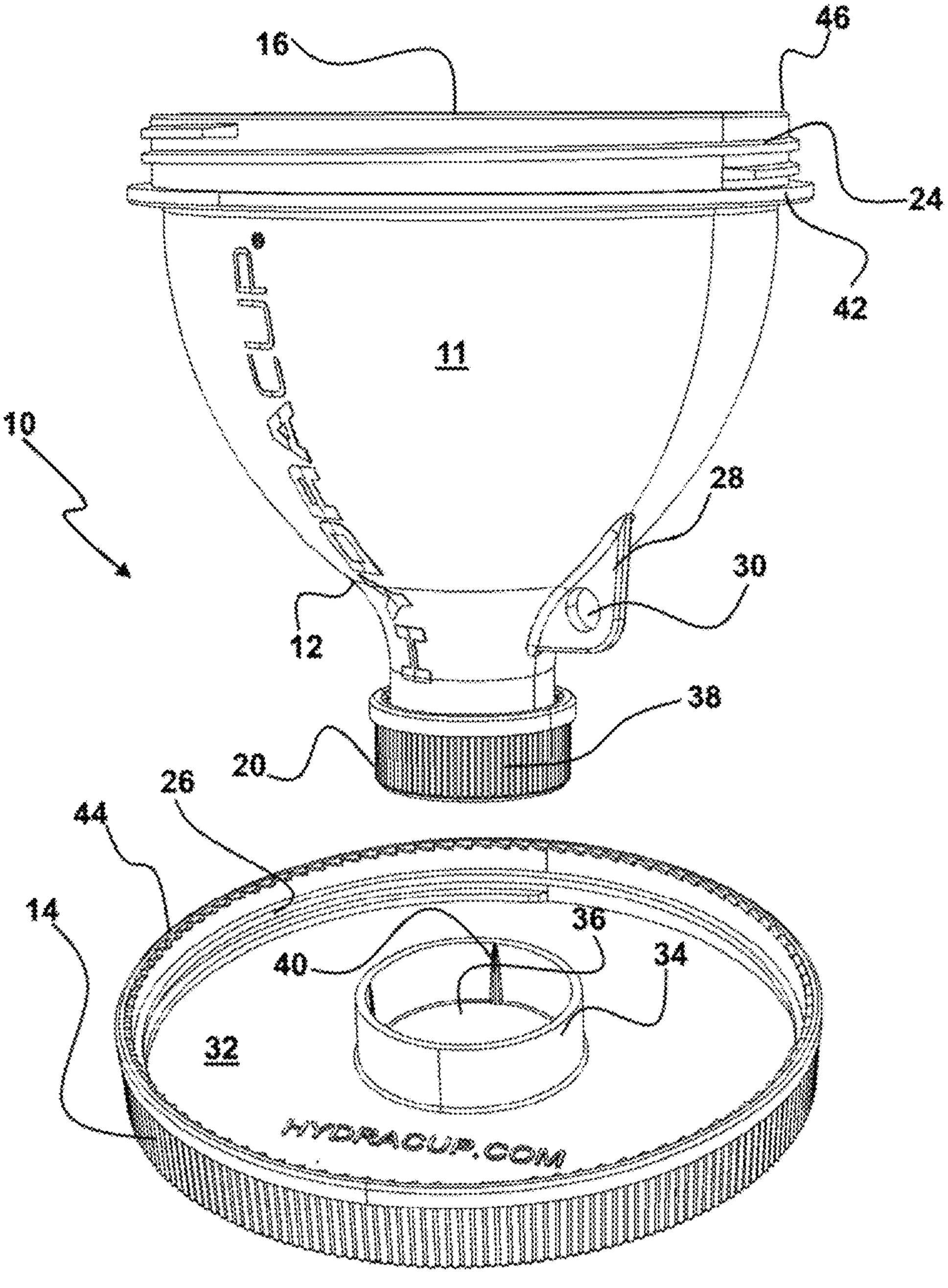
FIG. 3 depicts the first lid removed from an engagement covering the first opening of the container body and ready for insertion of the second lid into a frictional engagement into a recess depending into the mounting projection extending from the lower surface of the first lid.
Figure 4:
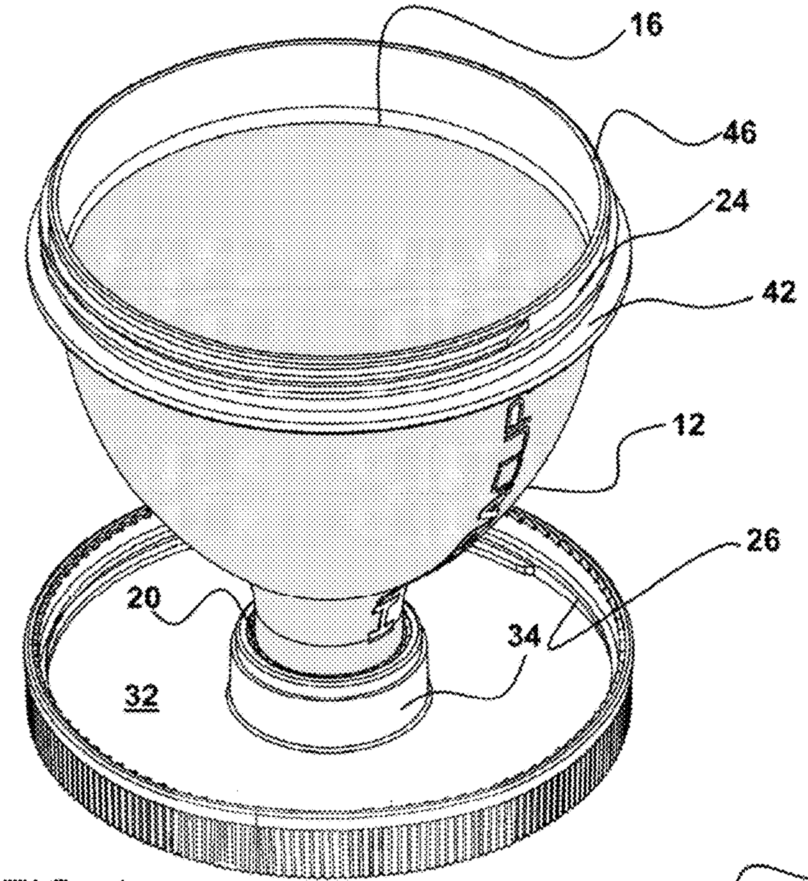
FIG. 4 shows the device of FIG. 3 wherein the first lid defines a stand to hold the container body elevated while the second lid is removably engaged within the recess of the mounting projection.
Figure 5:
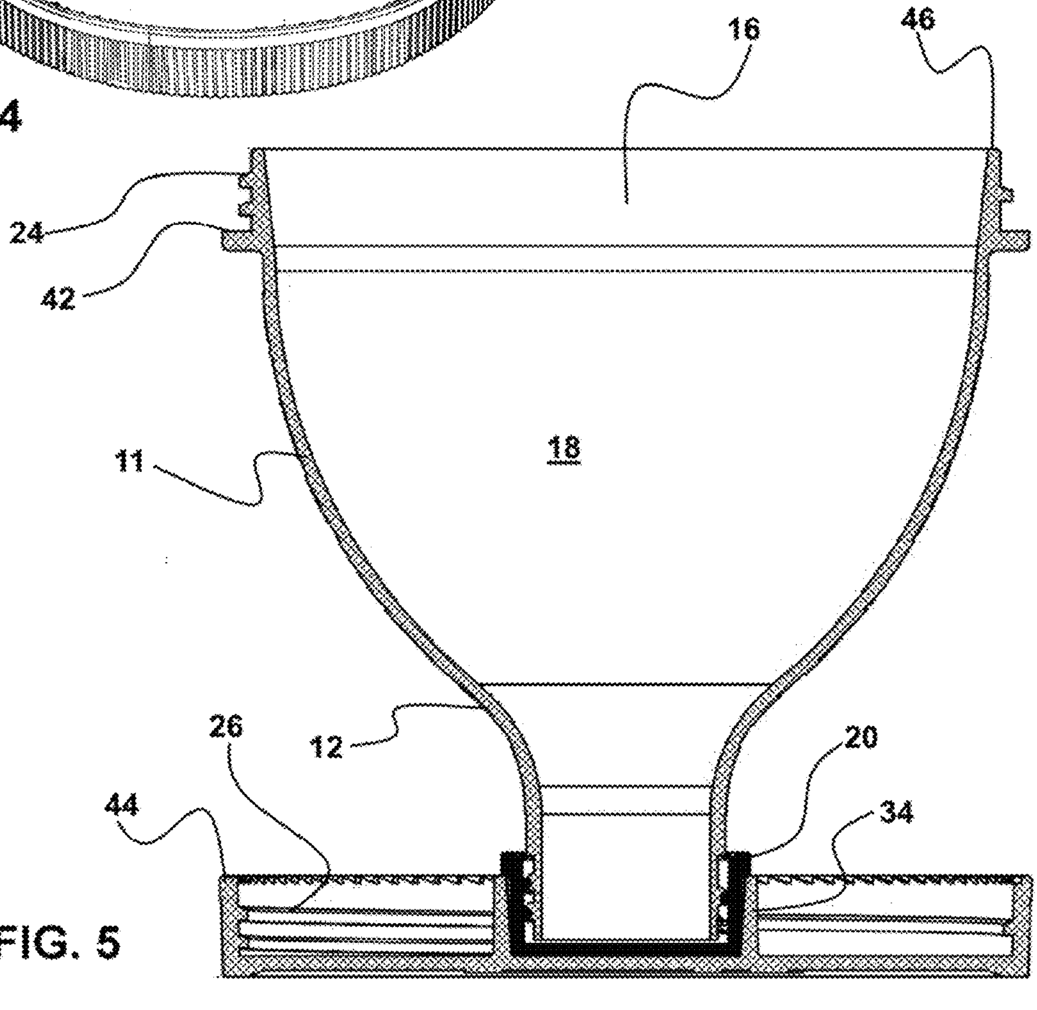
FIG. 5 is a sectional view through FIG. 4 showing the sidewall of the container body surrounding the internal cavity of the container and showing the second lid frictionally engaged within the recess of the mounting projection.

Shown in FIG. 3 is a depiction of the first lid 14 removed from engagement to the first end of the body 12 of the device 10 and positioned for placement in a removable engagement with the second lid 20 which is still engaged to the body 12. The lower surface 32 or interior surface of the first lid 14 has a mounting projection 34 extending therefrom. A recess 36 formed into the mounting projection 34 is sized to form a frictional engagement with the exterior surface 38 of the second lid 20 as shown in FIGS. 4-5. This removable frictional engagement of the first lid 14 with the second lid 20 is particularly preferred as it allows the first lid 14 to form a support to hold the body 12 in an upright position as in FIGS. 4-5.

The support, as shown, extends a distance substantially equal to or just slightly larger than the first opening 16 and forms an especially stable mount that is resistant to tipping of the body 12. This is most important in that it allows the user to place the body 12 in the supported position engaged with the first lid 14 which defines a support base while they place supplements or other food material into the internal cavity 18 through the first opening 16. The provision of the first lid 14, which also functions as a support when removed, thus, allows users to place the body 12 in the supported position atop the first lid 14 and measure and fill the food or supplements or the like in the proper or desired amounts into the internal cavity 18. Thereafter, the first lid 14 may be re-engaged over the first opening 16 to seal it and the material inside.

The mounting projection 34 is preferably formed of polymeric material which is slightly elastic in nature such that when the second lid 22 is slid into the recess 36, the wall defining the mounting projection 34 can slightly stretch and thereafter, impart a biased contact against the exterior surface 38 of the second lid 20. Such a biased contact will improve the holding of the body 12 in the supported position of FIGS. 4-5.

Also shown in FIG. 3 are one or a plurality of projections 40 extending from the interior surface of the mounting projection 34 and into the recess 36. These projections can contact against the exterior surface 38 of the second lid to improve the biased frictional engagement of the mounting projection 34 therewith, to hold the body 12 in the supported position as in FIGS. 3-4.

Shown in FIG. 5 is a sectional view through the body 12 while in the supported position as in FIG. 4. As shown, the sidewall 11 of the body 12 defines the substantially funnel like shape thereof as well as defining the size and volume of the internal cavity 18. Also shown are an annular ledge 42 which can contact against the first lid lower edge 44 of the first lid 14 to form a secondary seal. A primary seal is formed by the contact of the lower surface 32 of the first lid 14 against the upper edge 46 of the sidewall 11 which surrounds the first opening 16.

Figure 6:
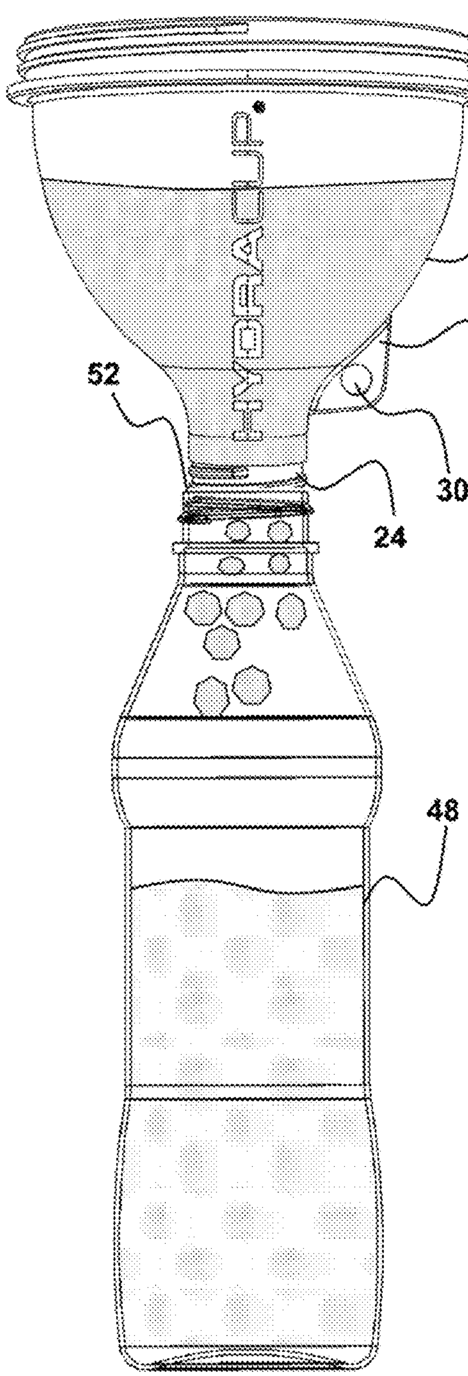
FIG. 6 depicts the container body of the device and system herein, operatively engaged with a secondary container and operating as a funnel for the contents held within the internal cavity of the container body.

In FIG. 6 is depicted the container body 12 operatively engaged in a removable engagement with a secondary container 48. As shown, the exterior circumference of the body 12 at the second end from which the second lid 20 is disengaged, is equal to or slightly smaller than the fill opening 52 of the secondary container 48. Such fill openings are widely employed as drink openings in such containers, for example a water bottle, where the user may tip the secondary container to have fluid from within exit through the fill opening 52. As such, it is preferred that the diameter and/or circumference of the body 12 at the second end, on which the second lid 20 engages to a removable sealed engagement, is formed to slide into the fill opening 52 of the chosen secondary container 48. This allows the body 12 of the device 10 to act as a funnel, wherein the contents of the internal cavity 18, such as food or supplements or the like, may be communicated into the interior cavity of the secondary container 48 easily.

Figure 7:
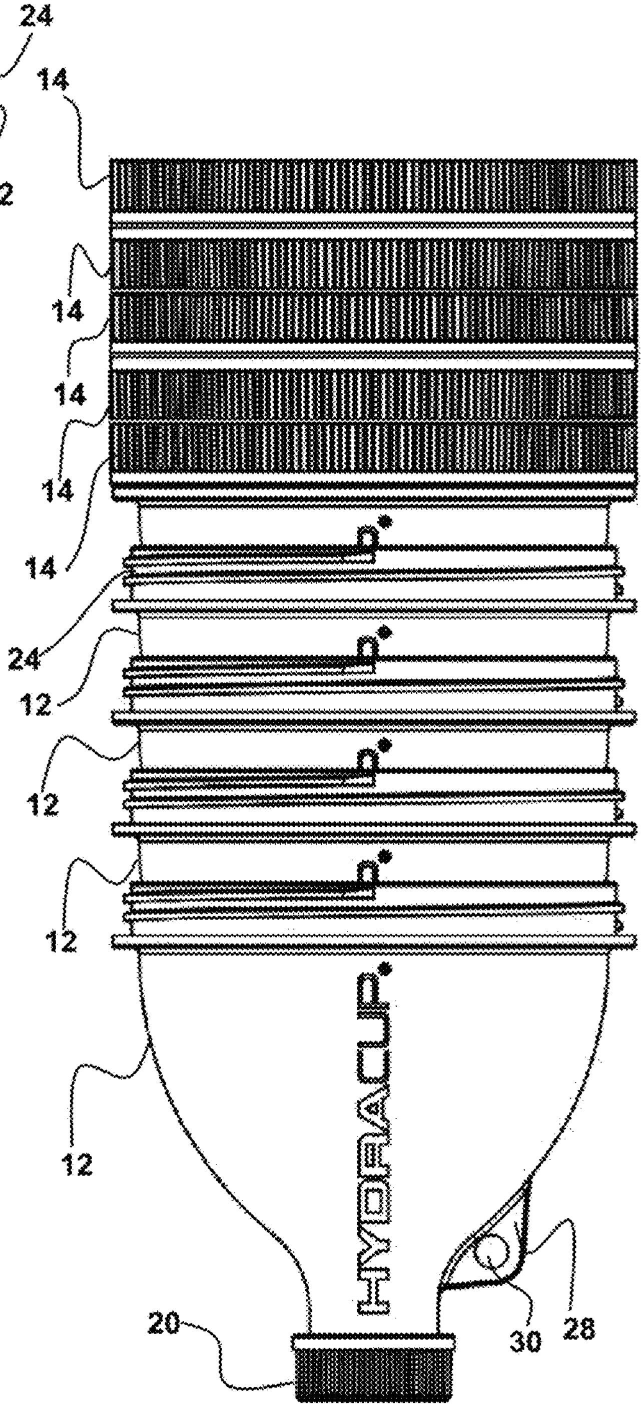
FIG. 7 shows the body of the container provided in a kit featuring a plurality of container bodies which are positionable to a nested stack.

The device 10 herein can be sold or marketed as a kit such as is shown in FIG. 7 wherein a plurality of bodies 12 are made available. Each body 12 will be engageable at the first end thereof with the first lid 14. Each body 12 will be removably engageable at the second end of the body 12 with the second lid 20.

Each of the bodies 12 are engageable with adjacent bodies 12 to form a nesting engagement. By nesting engagement is meant herein that each of the bodies 12 have substantially the same funnel shape wherein bodies 12 adjacent and on the first side of one body 12, and each are sequentially insertable into the internal cavity 18 of an adjacent body 12 by insertion therein through the exposed first opening 16. Thereafter, sequential additional bodies 12 can be sequentially engaged in the nesting engagement by insertion of each sequentially into the open first opening 16 of previously engaged bodies 12. The ability to form such a nesting engagement is most preferred for the device 10 herein because it significantly reduces the area needed to store multiple bodies 12 for use, which is common with many users who will place multiple different supplements or food and the like in multiple different bodies 12, so it can be consumed at an appropriate time.

It should be noted that the container device and system herein, has other applications potentially, and one skilled in the art could discover these or discern such on reading this disclosure. The description of the features and employment of this invention does not limit the claims of this application and applications for the device and system herein developed by those skilled in the art will be included in this invention.

Further, while all of the fundamental characteristics and features of the container device and system invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A container apparatus comprising:

a body having a shape defined by a sidewall;

a first opening at a first end of the body communicating with an internal cavity of the body;

a second opening at a second end of the body opposite the first end, the second opening communicating with the internal cavity;

a first lid removably engageable at the first end of the body to form a first sealed engagement over the first opening;

a second lid removably engageable at the second end of the body to form a second sealed engagement over the second opening;

the second end of the body sized for forming a funneled engagement with a secondary container, whereby contents positioned within the internal cavity can be communicated into an interior of the secondary container with the second end of the body in the funneled engagement;

a mounting projection extending from a central area of one side surface of the first lid, the mounting projection having a recess formed therein;

an exterior surface of the second lid positionable to a removable engagement within the recess;

the first lid defining a stand to support the body in an upright position whereby the contents are positionable through the first opening into the internal cavity with the body held in the upright position by the stand.

2. The container apparatus of claim 1 additionally comprising: the shape of the body defined by the sidewall being a funnel shape, the funnel shape narrowing from a wider end of the body defined by the sidewall surrounding the first opening to a narrow end of the body defined by the sidewall surrounding the second opening.

3. The container apparatus of claim 1, additionally comprising: the removable engagement of the exterior surface of the second lid within the recess being a frictional engagement of an interior wall surrounding the recess with the exterior surface of the second lid.

4. The container apparatus of claim 1, additionally comprising: the container apparatus provided as a kit including a plurality of nestable bodies.

5. The container apparatus of claim 1, additionally comprising:

a connecting member extending from an exterior surface of the sidewall opposite an interior surface of the sidewall surrounding the internal cavity; and a passage communicating through an opening in the connecting member, the passage for positioning a connector therein whereby the container can be engaged to the person of a user for carrying supported by the connector.

6. The container apparatus of claim 1, additionally comprising:

the first lid being removably engageable to the first end of the body in a first threaded connection of threads formed on the first cap with first mounting threads formed on the sidewall at the first end of the body; and the second lid being removably engageable to the second end of the body in a second threaded connection of threads formed on the second cap with second mounting threads formed on the sidewall at the second end of the body.

7. A container apparatus comprising:

a funnel body with a top opening and a bottom opening opposite the top opening, the bottom opening narrower than the top opening;

a first lid configured to releasably attach to the funnel body for closing the top opening; a second lid configured to releasably attach to the funnel body for closing the bottom opening;

wherein the first lid has an underside with a mount configured to releasably attach the second lid, the underside and the mount forming an integral part of the first lid, and wherein upon attachment, the second lid is flush with the first lid.

8. The container apparatus of claim 7, the first lid configured to form a base for standing the funnel body in an upright position.

9. The container apparatus of claim 7, further comprising an annular member with aperture formed on the side of the funnel body.

* * * * *